US009179272B2

(12) United States Patent
Meunier et al.

(10) Patent No.: US 9,179,272 B2
(45) Date of Patent: Nov. 3, 2015

(54) METHOD OF PROCESSING SHORT MESSAGES (SMS) AND WIRELESS COMMUNICATION APPARATUS ENABLING SUCH PROCESSING

(75) Inventors: Laurent Meunier, Coulaines (FR); Yvan Fily, Le Mans (FR)

(73) Assignee: ST-Ericsson (France) SAS, Grenoble (FR)

( * ) Notice: Subject to any disclaimer, the term of this patent is extended or adjusted under 35 U.S.C. 154(b) by 714 days.

(21) Appl. No.: 13/145,828

(22) PCT Filed: Jan. 21, 2010

(86) PCT No.: PCT/EP2010/050688
§ 371 (c)(1),
(2), (4) Date: Oct. 3, 2011

(87) PCT Pub. No.: WO2010/084155
PCT Pub. Date: Jul. 29, 2010

(65) Prior Publication Data
US 2012/0021784 A1    Jan. 26, 2012

(30) Foreign Application Priority Data
Jan. 22, 2009   (FR) ...................................... 09 50393

(51) Int. Cl.
*H04W 4/14*   (2009.01)
(52) U.S. Cl.
CPC ...................... *H04W 4/14* (2013.01)
(58) Field of Classification Search
CPC ....... H04W 4/14; H04W 88/184; H04W 8/18; H04W 4/12; H04W 76/002; H04W 88/16; H04W 8/245
USPC .................................. 455/466; 709/206, 207
See application file for complete search history.

(56) References Cited

U.S. PATENT DOCUMENTS

| 7,406,308 | B2* | 7/2008 | Moon .................. 455/412.2 |
| 7,986,942 | B2* | 7/2011 | Kang .................. 455/412.1 |
| 8,081,587 | B2* | 12/2011 | Beckmann et al. ........... 370/310 |
| 2002/0173319 | A1 | 11/2002 | Fostick |
| 2003/0086438 | A1* | 5/2003 | Laumen et al. ............... 370/462 |
| 2003/0105826 | A1* | 6/2003 | Mayraz .................. 709/206 |
| 2004/0242202 | A1* | 12/2004 | Torvinen .................. 455/412.1 |
| 2006/0105752 | A1* | 5/2006 | Jeong .................. 455/414.1 |

(Continued)

FOREIGN PATENT DOCUMENTS

WO      2005/041549 A1    5/2005

OTHER PUBLICATIONS

EPO, Int'l Search Report in PCT/EP2010/050688, Apr. 6, 2010.

(Continued)

*Primary Examiner* — Liton Miah
(74) *Attorney, Agent, or Firm* — Piedmont Intellectual Property

(57) ABSTRACT

The method of processing short messages within a wireless communication system comprises an assignment to said short messages of indicators transmitted with said short messages, an initialization (11), upon the transmission of a short message initiating a discussion, of the content of the indicator (IND) associated with this initiating short message, with an initial content comprising an identification of said discussion, and an update (15) of the content of the indicator of each short message sent in response to a received short message and relating to said discussion on the basis of the content of the indicator of said received short message.

20 Claims, 14 Drawing Sheets

(56) References Cited

U.S. PATENT DOCUMENTS

Figure 1:
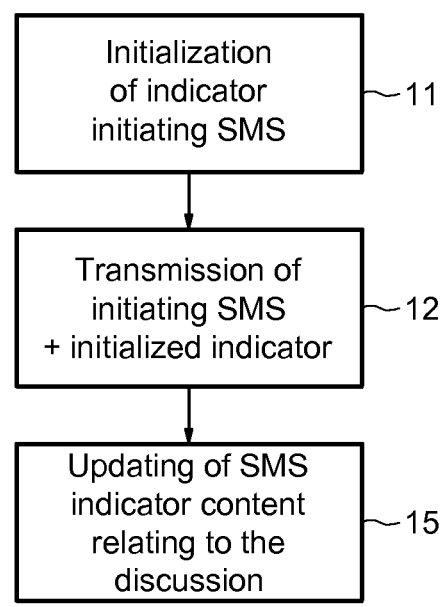

| | | | |
|---|---|---|---|
| 2007/0201653 A1* | 8/2007 | Tsukamoto | 379/142.06 |
| 2007/0287483 A1* | 12/2007 | Park et al. | 455/466 |
| 2009/0061825 A1* | 3/2009 | Neelakantan et al. | 455/412.1 |
| 2009/0109872 A1* | 4/2009 | Skubacz et al. | 370/254 |
| 2009/0216696 A1* | 8/2009 | Downs et al. | 706/20 |

OTHER PUBLICATIONS

EPO, Written Opinion in PCT/EP2010/050688, Apr. 6, 2010.
3GPP, Technical Specification 23.040 V8.5.0, Technical Realization of the Short Message Service (SMS) (Release 8), Jun. 2009.
3GPP, Technical Specification 31.102 V8.6.0, Characteristics of the Universal Subscriber Identity Module (USIM) Application (Release 8), Mar. 2009.

\* cited by examiner

| Direction | TO | Comments |
|---|---|---|
| To <someone> (SMS-SUBMIT) | 0 | UE is not the iniator of the TID parameter |
| To <someone> (SMS-SUBMIT) | 1 | UE is the initiator of the TID parameter |
| From <someone> (SMS-DELIVER) | 0 | Reply in a discussion initiated by UE |
| From <someone> (SMS-DELIVER) | 1 | Reply in a discussion in which UE has been invited |

Laurent's apparatus

| SMS No. | Direction | TID | TO | SID | Comments & messages |
|---|---|---|---|---|---|
| 1 | To Yvan | 0 | 1 | 0 | Start of a discussion<br>Message : Hello Yvan |
| 2 | From Yvan | 0 | 0 | 1 | Reply to SMS from Laurent<br>SID has been incremented<br>Message : Hello Laurent, what are you up to? |
| 3 | To Yvan | 0 | 1 | 2 | Laurent sends a new message<br>Message : You fancy a glass of something? |
| 4 | From Yvan | 0 | 0 | 3 | Yvan replies to the SMS from Laurent<br>SID has been incremented<br>Message : Why not |
| 5 | From Bobby | 5 | 0 | 0 | Laurent receives a new message invitation to discussion<br>(Laurent is not the initiator)<br>Message : We won ! PSG 0 - 6 CAEN |
| 6 | To Bobby | 5 | 0 | 1 | Laurent sends a message to Bobby<br>SID has been incremented<br>Message : Yes! Champions! |
| 7 | To Yvan | 0 | 1 | 4 | Laurent in parallel, continues the discussion with Yvan<br>Message : We'll meet at midday |
| 8 | From Bobby | 5 | 0 | 2 | Bobby sends a message<br>Message : they've done it |
| 9 | To Billy | 1 | 1 | 0 | Laurent begins a new discussion with billy<br>Message : Where's the cat? |
| 10 | From Yvan | 0 | 1 | 5 | Message : Midday's fine with me |
| 11 | From Billy | 1 | 0 | 1 | Reply from Billy<br>Message : The cat is in the kitchen |
| 12 | From Yvan | 0 | 1 | 0 | Yvan begins a new discussion with Laurent<br>Message : What have you been up to recently? |
| 13 | From Yvan | 0 | 0 | 1 | Laurent replies to TID 0<br>SID has been incremented<br>Message : I'm well |

FIG.5

Yvan's apparatus

| SMS No. | Direction | TID | TO | SID | Comments & messages |
|---|---|---|---|---|---|
| 1 | From Laurent | 0 | 1 | 0 | Yvan receives an invitation to discussion from Laurent<br>Message : Hello Yvan |
| 2 | To Laurent | 0 | 0 | 1 | Yvan replies<br>SID has been incremented<br>Message : Hello Laurent What are you up to? |
| 3 | From Laurent | 0 | 1 | 2 | Message : You fancy a glass of something? |
| 4 | To Laurent | 0 | 0 | 3 | Yvan replies to the SMS from Laurent<br>SID has been incremented<br>Message : Why not |
| 5 | From Laurent | 0 | 1 | 4 | Message : We'll meet at midday |
| 6 | To Laurent | 0 | 1 | 5 | Message : Midday's fine with me |
| 7 | To Laurent | 0 | 1 | 0 | Yvan begins a new discussion with Laurent<br>Message : What have you been up to recently? |
| 8 | From Laurent | 0 | 0 | 1 | Reply from Laurent<br>Message : I'm well |
|  |  |  |  |  |  |

Rows labeled 601–608.

FIG.6

Screen of Laurent's apparatus

| | | | |
|---|---|---|---|
| to | Billy | Where's the cat? | ⎫ DISC1 |
| from | Billy | The cat is in the kitchen | ⎭ |
| | | | ECRL |
| from | Bobby | We won! PSG 0 - 6 CAEN | ⎫ |
| to | Bobby | Yes! Champions! | ⎬ DISC2 |
| from | Bobby | They've done it | ⎭ |
| to | Yvan | Hello Yvan | ⎫ |
| from | Yvan | Hello Laurent what are you up to? | |
| to | Yvan | You fancy a glass of something? | |
| from | Yvan | Why not | ⎬ DISC3 |
| to | Yvan | We'll meet at midday | |
| from | Yvan | Midday's fine with me | ⎭ |
| from | Yvan | What have you been up to recently? | ⎫ DISC4 |
| to | Yvan | I'm well | ⎭ |

FIG.8

Laurent's apparatus

| | SMS No. | Direction | TID | TO | SID | INDS | Comments & messages |
|---|---|---|---|---|---|---|---|
| | | | | | | | |
| | | | | | | | |
| 504 | 4 | From Yvan | 0 | 0 | 3 | True | Yvan replies to the SMS from Laurent<br>SID has been incremented<br>Message : Why not |
| | | | | | | | |
| 507 | 7 | To Yvan | 0 | 1 | 4 | | Laurent in parallel continues the discussion with Yvan<br>Message : What have you been up to recently?<br>(INDS message 4 = true) |
| | | | | | | | |
| 514 | 14 | To Yvan | 1 | 1 | 0 | | Laurent replies again to message 4<br>New TID = TIDX<br>{ TID = 0 ; TO = 1 ; SID = 4 }<br>Message : Don't forget the U2 CD |
| 515 | 15 | From Yvan | 1 | 0 | 1 | True | Message : No problem! |
| 516 | 16 | To Yvan | 1 | 1 | 2 | | Message : and the Police CD<br>(INDS message 15 = true) |
| 517 | 17 | From Yvan | 1 | 0 | 3 | False | Message : Okay |
| | | | | | | | |

FIG.11

Yvan's apparatus

| SMS No. | Direction | TID | TO | SID | INDS | Comments & messages |
|---|---|---|---|---|---|---|
| | | | | | | |
| 9 | From Laurent | 1 | 1 | 0 | True | Message : Don't forget the U2 CD { TID = 0 ; TO = 1 ; SID = 4 } |
| 10 | To Laurent | 1 | 0 | 1 | | Message : No problem! (INDS message 9 = true) |
| 11 | From Laurent | 1 | 1 | 2 | True | Message : And the Police CD |
| 12 | To Laurent | 1 | 0 | 3 | | Message : Okay (INDS message 11 = true) |
| | | | | | | |

FIG.12

User data header of SMS (3GPP TS23.040)

Coding of EF_SMS (3GPP TS31.102)

METHOD OF PROCESSING SHORT MESSAGES (SMS) AND WIRELESS COMMUNICATION APPARATUS ENABLING SUCH PROCESSING

The invention relates to wireless communications, and more particularly the processing of short messages, more commonly referred to by those skilled in the art, in a misuse of language, by the acronym "SMS" (Short Message Service, a term well known to those skilled in the art) or even by the expression "text".

Typically, the users of wireless communication apparatus, for example cellular mobile telephones, can mutually send each other SMSs by replying for example to an SMS received previously. They can also undertake a number of discussions in parallel with different parties. It is currently difficult for the users to remember the questions and the replies submitted during one and the same discussion and that have been inserted in prior messages.

This is because, currently, the current standard that deals with SMSs, namely 3GPP Standard TS23.040, does not provide any means for the manufacturers of mobile telephones to effectively take account of these SMSs forming discussions. There do currently exist some embodiments that make it possible to take account of the different SMSs forming a discussion. However, these embodiments are available only for Open OS devices (Windows Mobile, Palm OS, etc.) and rely on proprietary embodiments implementing, for example, proprietary information and date and time indications.

In other words, the current solutions for processing SMSs forming a discussion are applicable only for certain types of smart phones (an expression known to those skilled in the art) and rely on proprietary embodiments that further require the storage of the SMSs in the memory of the device, and not in the SIM card.

Because of this, the processing of SMSs representing a discussion is possible only between users who have the same smart phone and are using the same SMS application for the discussion.

Because of this, no interoperability is possible between a conventional telephone and a smart phone of the type mentioned hereinabove.

Furthermore, the users cannot remove their SIM card to insert it into another telephone and obtain a representation of the SMSs of said discussion on their new telephone.

According to one implementation and embodiment, there is proposed a method of processing short messages and a wireless communication apparatus, using in particular an SMS encoding, to make it possible to improve the recognition of SMSs forming a discussion and make it simpler, for the user, to recover them and read them.

According to another implementation and embodiment, there is proposed a method of processing SMSs and an apparatus that make it possible to offer interoperability with apparatus that do not implement such a method.

According to another implementation and embodiment, there is proposed a method and an apparatus that make it possible to also simply recognize new discussions beginning from a message or SMS, which has already been replied to within a preceding discussion.

According to one aspect, there is thus proposed a method of processing short messages within a wireless communication system. This method comprises an assignment to said short messages of indicators transmitted with said short messages. Moreover, upon the transmission of a short message initiating a discussion, the content of the indicator associated with this initiating short message is initialized with an initial content. This initial content comprises an identification of said discussion. Furthermore, the content of the indicator of each short message sent in response to a received short message and relating to said discussion is updated on the basis of the content of the indicator of said received short message.

Thus, the assignment of an indicator to each short message, the initialization of the content of the indicator associated with a short message initiating a discussion with an identifier of this discussion and finally an update of the content of the indicator of each short message of the discussion makes it possible to sort the SMSs sent and received by a user, and classify them in groups so as to clearly differentiate the possible different discussions.

According to one implementation, in which there is also provided a storage of all the short messages relating to said discussion as well as the corresponding indicators in each wireless communication apparatus involved in said discussion, it is possible to obtain, in response to a display command on one of these wireless communication apparatus, an ordered display, for example chronological, of all the short messages sent and received by said apparatus during said discussion.

When each wireless communication apparatus includes a subscriber identification module, commonly designated by those skilled in the art by the acronym "SIM card", it is particularly advantageous to store all the short messages relating to said discussion, as well as the associated indicators, in this subscriber identification module. This will make it possible to retain the possibility of an ordered display of the SMSs relating to the discussion, even when the SIM card is removed from the telephone and inserted into another telephone.

One particularly simple and effective way of structuring each indicator consists in providing for said indicator to comprise a first field, a second field and a third field. With such a structure, the initialization of the content of the indicator assigned to said short message initiating said discussion can then comprise:
  the assignment to the first field of an identification value representative of said identification of said discussion;
  the assignment of a first informative value (for example the logic value 1) to the second field; and
  the assignment of an initial value (for example the zero value) to the third field.

In this case, the updating of the content of an indicator of an SMS sent in reply to a received short message advantageously comprises:
  the assignment to the first field of said identification value; in other words, the identification value used to identify the discussion is unchanged during said discussion,
  the assignment to the second field of said first informative value (for example the logic value 1) if the short message is sent by the apparatus initiating said discussion, and of a second informative value different from the first informative value (for example the logic value zero) otherwise, and
  incrementation of the value of the third field of said received short message so as to obtain the value of the third field of said short message sent in response to these received short messages.

Preferably, said indicators are inserted into the headers of the short messages at available positions specified by the 3GPP Standard TS23.040, in particular those marked as reserved for future use. In practice, if a wireless communication apparatus, for example a cellular mobile telephone, receives SMSs that have been assigned indicators, and it is not configured to implement the processing method defined hereinabove, it will purely and simply not recognize these indicators. Interoperability is thus assured between wireless communication apparatus capable of implementing the processing method defined hereinabove, and satisfying the 3GPP Standard TS23.040, and those for which implementation for the processing of the SMSs of a discussion as defined hereinabove is not provided.

According to one implementation, in the event of transmission of a new short message representing a new reply to a received short message to which a reply has already been given previously during said discussion, this new short message is considered as a new short message initiating an auxiliary discussion, and the content of the indicator assigned to this new initiating message is initialized with an initial content comprising an auxiliary identification of this auxiliary discussion.

This, in a way, makes it possible to create a subset of SMSs attached to the main set.

Also, when all the short messages relating to said auxiliary discussion, as well as corresponding indicators, are stored in each wireless communication apparatus involved in said auxiliary discussion, it is then possible, in response to the display command on one of these wireless communication apparatus, to display in an ordered manner the short messages sent and received by said apparatus during the discussion and said auxiliary discussion.

A solution that is particularly simple to implement for identifying and labelling this subset of short messages consists in also assigning each short message a supplementary indicator. Also, each time a reply is sent to a received short message that relates to said discussion, a first indicative value (for example, the logic value "TRUE") is assigned to the supplementary indicator assigned to this received short message whereas a second indicative value (for example a logic value "FALSE") is assigned to said supplementary indicator if there is no reply to said received short message. Also, if a new short message representing a new reply to a received short message assigned a supplementary indicator having said first indicative value (for example the logic value "TRUE") is sent, this new short message is considered to be the new short message initiating said auxiliary discussion.

Here again, it is particularly advantageous to also store all the short messages of said auxiliary discussion, as well as said associated supplementary indicators, in the subscriber identification module (SIM card).

In this respect, it is possible to represent a supplementary indicator of a short message by a bit of an entry in the file EF_SMS defined in the 3GPP Standard TS31.102.

According to another aspect, there is also proposed a wireless communication apparatus comprising:
 an interface configured to send and receive short messages assigned indicators transmitted with said short messages, and processing means comprising
 initialization means configured to initialize the content of the indicator associated with a short message initiating a discussion with an initial content including an identification of said discussion, and
 updating means configured to update the content of the indicator of each short message to be sent in reply to a received short message relating to said discussion based on the content of the indicator of said received short message.

According to one embodiment, the apparatus comprises memory means configured to store all the short messages relating to said discussion as well as the corresponding indicators, a display means, a user interface, and the processing means also comprise generation means, coupled to the memory means, and configured, in response to a command on the user interface, to deliver to the display means all the short messages sent and received by said apparatus during said discussion so as to obtain an ordered display of these short messages.

According to one embodiment, the wireless communication apparatus comprises a subscriber identification module including said memory means.

According to one embodiment, said indicator comprises a first field, a second field and a third field, in which the initial content of the indicator assigned to said short message initiating said discussion comprises:
 in the first field, an identification value representative of said identification of said discussion,
 in the second field, a first informative value, and
 an initial value in the third field, and
 the means of updating the content of an indicator of an SMS to be sent in reply to a received short message are configured to
 assign said identification value to the first field,
 assign said first informative value to the second field if said apparatus is the apparatus initiating said discussion and a second informative value different from the first informative value, otherwise, and
 increment the value of the third field of said received short message so as to obtain the value of the third field of said short message to be sent in reply to this received short message.

According to one embodiment, the initialization means are configured to, in the case of a new short message to be sent and representing a new reply to a received short message having already been the subject of a reply during said discussion, initialize the content of the indicator assigned to this new short message with an initial content so as to consider this new short message as a new short message initiating an auxiliary discussion, the initial content of this new initiating message comprising an auxiliary identification of this auxiliary discussion.

According to one embodiment, the memory means are configured to also store all the short messages relating to said auxiliary discussion as well as corresponding indicators, and the generation means are also configured to, in response to said command on the user interface, also deliver to the display means the short messages sent and received by said apparatus during said auxiliary discussion so as to obtain an ordered display of the short messages of said discussion and of said auxiliary discussion.

According to one embodiment, each short message is also assigned a supplementary indicator, and the processing means include a supplementary block configured to assign a first indicative value to the supplementary indicator assigned to a received short message relating to said discussion and intended to give rise to a reply, and assign a second indicative value to said supplementary indicator if there is no reply to said received short message, and if a new short message representing a new reply to a received short message assigned a supplementary indicator having said first indicative value is sent, this new short message is considered to be the new short message initiating said auxiliary discussion.

Figure 15:
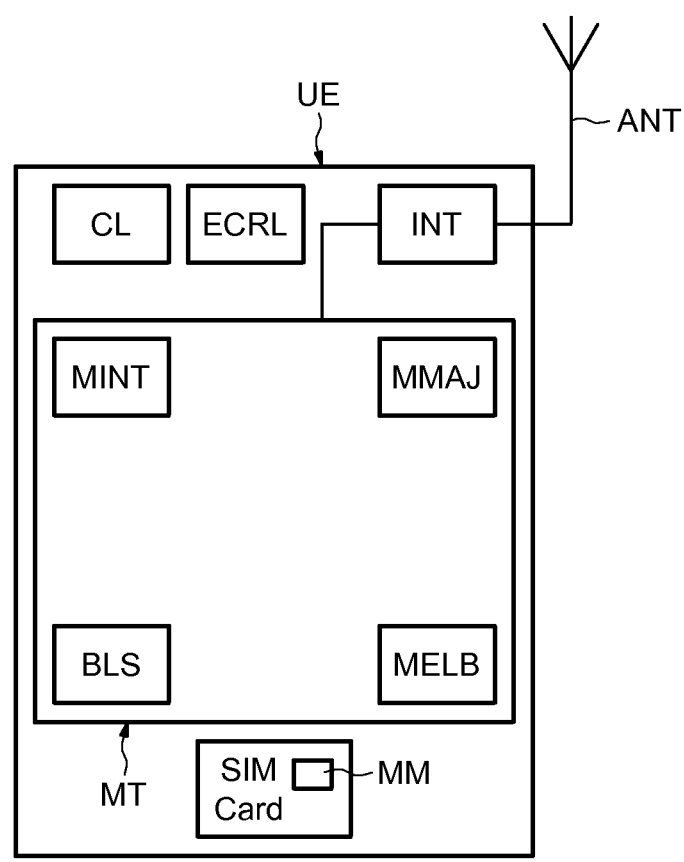
Figure 16:
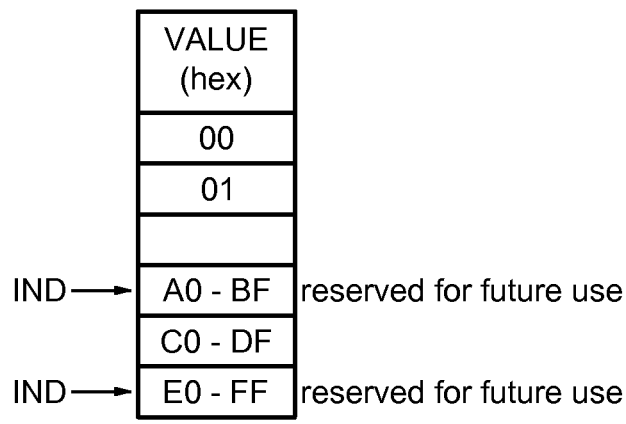
Figure 17:
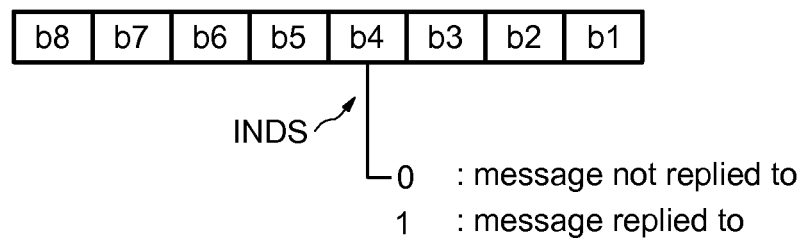

Other advantages and characteristics of the invention will become apparent from studying the detailed description of embodiments and implementations that are by no means limiting, and the appended drawings in which:

FIGS. 1 to 8 diagrammatically illustrate a first implementation of the invention;

FIGS. 9 to 14 diagrammatically illustrate a second implementation of the invention;

FIG. 15 diagrammatically illustrates an embodiment of a wireless communication apparatus according to the invention; and FIGS. 16 and 17 illustrate exemplary implementations and embodiments of the invention within existing standards.

Currently, when a user wants to view the short messages (designated hereinafter, also in a misuse of language, by the acronym "SMS") that he has received or sent during the different discussions that he might have had with different parties, he has the possibility of viewing a list of his sent SMSs or else the list of his received SMSs, without it being possible to combine these SMSs in groups to take account of how they belong to the different discussions.

According to one aspect of the invention, it is proposed to provide the user with the possibility of grouping together the SMSs sent and received and relating to one and the same discussion, so that he can notably view them on the screen of his wireless communication apparatus in a logical and ordered manner, for example chronologically.

The invention applies more particularly, but not in a limiting way, to the current standard governing the short message service (SMS) and known by those skilled in the art by the reference 3GPP Standard TS23.040.

To initiate a discussion, a user will dial, on his wireless communication apparatus, for example a cellular mobile telephone, the telephone number of the other party in order to be able to send him a first SMS. In practice, SMS-based discussion is set up over a communication channel using the telephone numbers of the two parties involved in said discussion.

For an SMS originating from a wireless communication apparatus, that is to say for a sent SMS (of the "SMS-SUBMIT" type), the destination address (for example a telephone number) is used to identify the remote party.

For an SMS terminating at a wireless communication apparatus, that is to say for a received SMS (for example of the "SMS-DELIVER" type), the origin address is used to identify the remote party.

The date and time of the different received SMSs, information that is already available and provided for in the Standard TS23.040, are not sufficient to enable the SMSs to be classified chronologically by discussion.

This is the reason why it is planned to assign each SMS an indicator that will be transmitted with said SMS.

Also, as illustrated in particular in FIG. 1, according to an implementation of the method of processing short messages according to the invention, there is provided (Step 11) an initialization, upon the transmission of a short message initiating a discussion, of the content of the indicator associated with this initiating short message with an initial content that includes an identification of said discussion.

The structure of this identification will be described in more detail hereinbelow.

Once initialized, the content of the indicator assigned to this initiating SMS is sent together with the SMS (Step 12).

Then, as the discussion progresses, the content of the indicator of each short message sent in reply to a received short message will be updated based on the content of the indicator of said received short message (Step 15).

Figure 2:
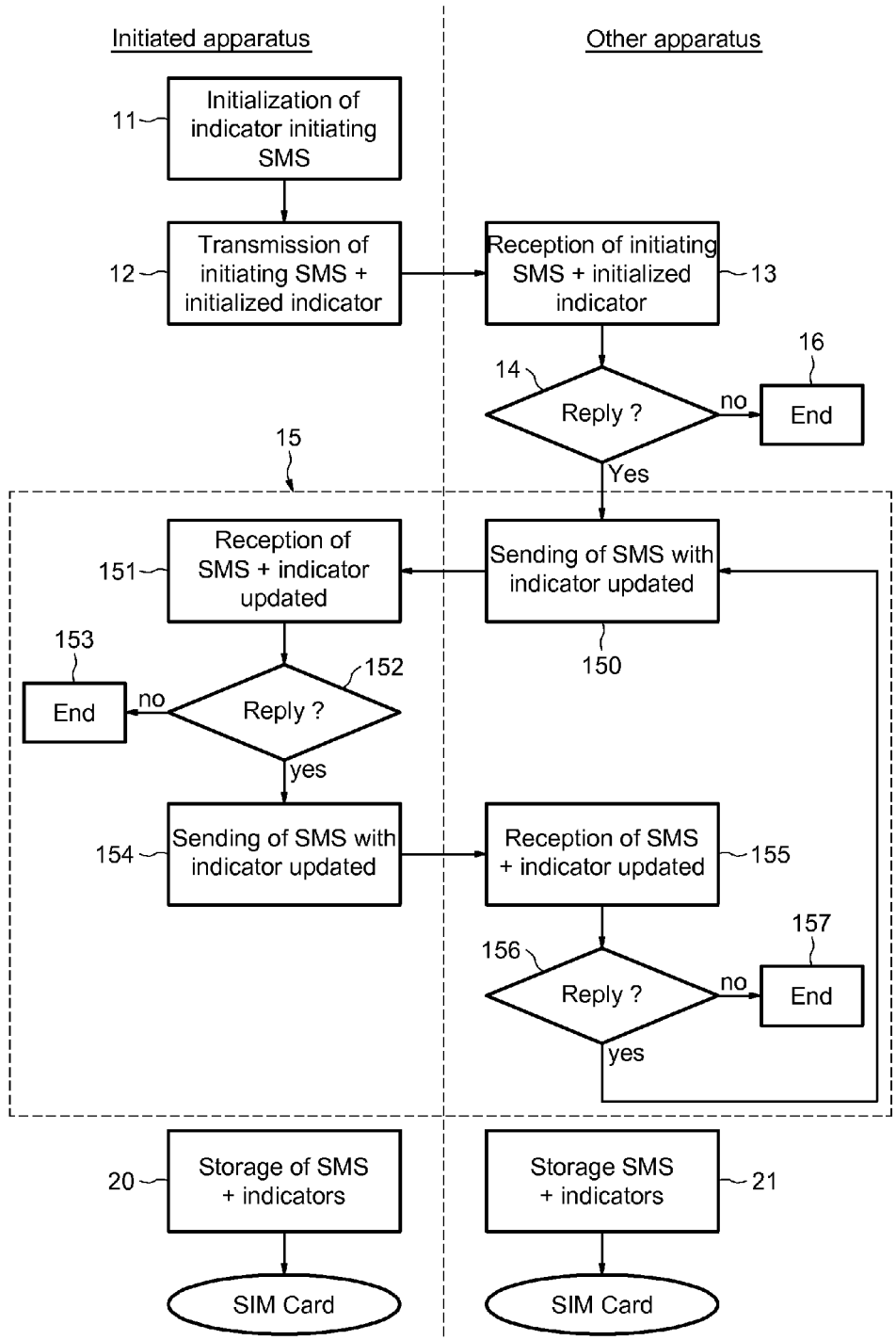

A more precise exemplary implementation is illustrated in FIG. 2.

Figures 3, 4:
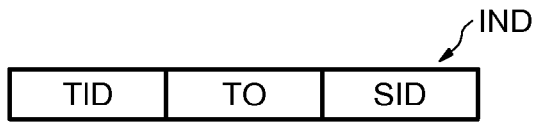

In this figure, the left-hand column diagrammatically illustrates the implementation steps carried out within the apparatus initiating the discussion, whereas FIG. 3 diagrammatically illustrates the implementation steps carried out within another apparatus involved in said discussion.

Thus, FIG. 2 shows the Steps 11 and 12 of initialization of the indicator of the initiating SMS and of transmission of the initiating SMS together with its initialized indicator.

On the other apparatus, the initiating SMS and its initialized indicator are received (Step 13). If no reply to this initiating SMS is sent, the discussion is terminated (Steps 14 and 16).

Otherwise, the other apparatus sends (Step 150) an SMS in reply with an indicator updated on the basis of the content of the initialized indicator received in the Step 13.

This new SMS is received (Step 151) on the initiating apparatus.

If there is no reply (Steps 152 and 153), the discussion is terminated.

Otherwise, a new SMS is sent to the other apparatus after its associated indicator has been updated based on the content of the indicator of the SMS received in the Step 151 (Step 154).

This SMS is received on the other apparatus (Step 155).

Here again, if there is no reply (Steps 156 and 157), the discussion is terminated.

Otherwise (Step 158), a new SMS is sent with an indicator that has an updated content (Step 150).

The succession of the steps of the block of Steps 15, that have just been described, is repeated until the end of the discussion.

In parallel with these updates within each apparatus, that is to say within the initiating apparatus and said other apparatus, all the SMSs sent and received, as well as their associated indicators, are stored (Steps 20 and 21) in a memory of the corresponding apparatus, and, preferably, in the SIM card of the apparatus.

While a discussion can be understood to be a link via a communication channel between two parties respectively having two apparatus, a number of discussions can be set up with different users at the same instant. For example, the user of a telephone can set up a discussion from his telephone with a second user having a second telephone, and also with a third user having a third telephone. Furthermore, two same users can have a number of discussions in parallel on different discussion topics.

Moreover, even though a discussion may finish at a given instant, it is in fact never closed because one of the parties can still resume it at any moment by replying, for example, to the last message received.

The identification of each discussion within the indicator assigned to the SMSs will make it possible to identify these discussions in a one-to-one manner, whatever the party.

This is why provision is made, as illustrated in FIG. 3, for the indicator IND assigned to each short message to include a first field intended to contain an identification value or parameter TID, that will be representative of said identification of said discussion.

That said, a user can be the initiator of a discussion or else receive a message and reply to it. It is then preferable to distinguish the sets of SMSs initiated by an initiating apparatus and those that are not initiated by the initiating apparatus. Otherwise, cases could arise in which a TID parameter corresponding to a discussion initiated by a user also corresponds to a TID parameter of a discussion to which said user has been invited.

This is why provision is preferably made for the indicator IND to also include a second field intended to store a parameter TO that can, as illustrated in FIG. 4, take a first informative value, for example the logic value "1", or else a second informative value, for example the logic value "0".

This TO parameter, together with the direction information "to someone" ("SMS-SUBMIT") or "from someone" ("SMS-DELIVER") will make it possible to be able to differentiate discussions possibly assigned the same TID parameter.

Thus, as illustrated in FIG. 4, and as an indication, when an apparatus UE is not the initiator of the TID parameter, that is to say, is not the initiator of a discussion, and he sends an SMS, the value "0" will be assigned to the TO parameter.

On the other hand, when the apparatus UE is the initiating apparatus of the TID parameter, the value "1" will be assigned to the TO parameter when an SMS is sent.

Also, when an apparatus receives an SMS assigned a TO parameter with the value "0", the receiving apparatus then understands that it is a reply to a discussion initiated by this apparatus UE.

In the case where a received SMS is assigned the TO parameter having the logic value "1", the apparatus UE then understands that it is a reply within a discussion to which the apparatus UE has been invited.

So as to allow for messages to be classified in an ordered manner, provision is advantageously made for the indicator IND to also include a third field intended to contain a third parameter SID which, as will be seen hereinbelow, after having been initialized with an initial value, for example the zero value, will be incremented in line with the SMSs sent during said discussion.

Thus, in this example, and in a general manner, the initialization of the content of the indicator IND assigned to the short messages initiating the discussion comprises:
- the assignment to the first TID field of an identification value representative of said identification of the discussion,
- the assignment of a first informative value, for example the value 1, to the second field TO, and
- the assignment of an initial value, for example the zero value, to the third field SID.

Also, the updating of the content of an indicator IND of an SMS sent in reply to a received short message comprises:
- the assignment to the first field TID of said identification value (that is to say that, in fact during the discussion, the value of the TID parameter will be unchanged),
- the assignment to the second TO of the first informative value (the logic value "1" for example) if said short message is sent by the apparatus initiating the discussion, and a second informative value (for example the zero value) different from the first informative value, in the contrary case, and
- an incrementation of the value of the third field SID of the indicator of the received short message so as to obtain the value of the third field SID of the short message sent in reply to this received short message.

Reference is now made more particularly to FIG. 5 to illustrate an exemplary update of the indicator IND. In this example, it is considered that a first user, Laurent for example, is holding discussions with other users, for example Yvan, Bobby and Billy.

FIG. 5 represents the short messages transmitted and sent from Laurent's apparatus and the corresponding parameters TID, TO and SID.

The left-hand column indicates the number of the SMS and the right-hand column is a comments column and also contains the content of the actual messages.

In the Step 501, Laurent initiates a discussion with Yvan. SMS no. 1 is therefore the SMS initiating this discussion. It is assigned the indicator IND within which the parameter TID has the value "0", the parameter TO has the value "1" and the parameter SID the initial value of zero.

In the Step 502, Laurent receives a reply from Yvan (SMS no. 2). Since it concerns the same discussion with Yvan, the parameter TID keeps the zero value whereas, in accordance with what has been described previously, the SMS received by Laurent from Yvan has a parameter TO that has a zero value and the parameter SID has been incremented (value "1").

In the Step 503, Laurent replies to Yvan. To this end, whereas Laurent had used, for example in the menu of his mobile telephone, the "new message" command in the Step 501, here, in the Step 503, he uses the "reply" command.

As in the Step 501, in the Step 503 the indicator of the new SMS includes the parameter TID equal to "0", the parameter TO equal to "1". Moreover, the parameter SID is incremented to take the value "2".

In the Step 504, Laurent receives a new reply from Yvan. The parameter TID and the parameter TO have the value "0" as in the Step 502. However, the parameter SID has been incremented to take the value "3".

In the step 505, Laurent receives a new message from a new party, in this case Bobby.

The parameter TO of the indicator of this received message is equal to one, so it is an invitation to discussion from Bobby. In other words, Laurent is not the initiator of the discussion.

Furthermore, since it is a new discussion, Bobby's apparatus has initialized the parameter TID of the indicator of the initiating message with the value "5" for example. Furthermore, the parameter SID has been initialized with the initial zero value.

In the Step 506, Laurent replies to Bobby. The parameter TID of the indicator of this message, sent in reply to the message received in the Step 505, keeps the value "5". However, the parameter TO takes the value "0" since Laurent's apparatus is not the "owner" of the parameter TID. Furthermore, the parameter SID is incremented to take the value "1".

In the Step 507, Laurent, in parallel, continues the discussion with Yvan and sends him a message. Since it concerns the discussion with Yvan, the parameter TID of the indicator of the message no. 7 has the value "0". The parameter TO has the value "1" and the parameter "SID" is incremented to take the value "4".

In the Step 508, Bobby sends a message in reply to the message no. 6 received from Laurent. Since it concerns the same discussion between Laurent and Bobby, the parameter TID of the indicator of the message 8 is equal to "5". The parameter TO of the indicator of this message is equal to "1" and the parameter SID has been incremented to the value "2".

In the Step 509, Laurent begins a new discussion with another party, in this case Billy. He therefore sends him an SMS whose content has been initialized with a new TID identification value, equal to "1" for example. The parameter TO is equal to "1" since Laurent is the initiator of the discussion and the parameter SID has the initial value of zero.

In the Step 510, Laurent receives message no. 10 from Yvan relating to the discussion identified by the parameter TID equal to "0" and that was initiated by Laurent. Consequently, the parameter TO has the value "1". The parameter SID has been incremented to take the value "5".

In the Step 511, the discussion between Laurent and Billy is continued with the receipt of a message no. 11 from Billy. This is a message relating to the discussion identified by the parameter TID="1". The parameter TO is equal to "0" since this discussion was also initiated by Laurent. Finally, the parameter SID is incremented to take the value "1".

In the Step 512, Yvan decides to begin a new discussion with Laurent. Consequently, Laurent receives an initiating message from Yvan. This initiating message no. 12 is assigned an indicator in which the value of the parameter TID is equal, for example, to "0" (value decided by Yvan's apparatus). The parameter TO is equal to "1" since Laurent is this time invited to the discussion by Yvan. Finally, the parameter SID is initialized with the value "0".

It will be noted here that the messages nos. 1 and 12 present the same values for the parameters TID, TO and SID. However, these two messages can be distinguished by the "direction" parameter. In practice, in one case, namely in the case of the message no. 1, it is a transmission whereas in the case of the message no. 12, it is a reception.

Finally, in the Step 513, Laurent replies to Yvan regarding the discussion by the parameter TID="0". The parameter TO of the indicator of the message no. 13 is equal to "0" since Laurent is not the owner of the parameter TID. Finally, the parameter SID has been incremented to the value "1".

On Yvan's apparatus, the two discussions with Laurent are represented in the table of FIG. 6. In this table, SMSs no. 1 and 8, sent or received respectively in the Steps 601 to 608, correspond to the SMSs sent or received in the Steps 501 to 504, 507, 510 and 512 to 513 of FIG. 5. Obviously, the indicators of the SMSs represented in the table of FIG. 6 are identical to the indicators of the corresponding SMSs represented in FIG. 5.

Figure 7:
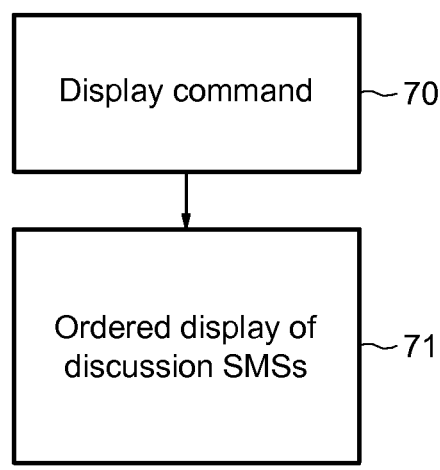

As illustrated in FIG. 7, in response to a display command 70 on one of the wireless communication apparatus involved in a discussion, for example when the apparatus is switched on, it is possible to then obtain (Step 71) a logical and ordered display of the set of SMSs in said discussion.

As an example, the sets of all the listed SMSs relating to the different discussions that Laurent could have had with the various other parties are obtained on the screen ECRL of Laurent's apparatus as illustrated in FIG. 8.

In the event, this concerns the discussion DISC1 with Billy, the discussion DISC2 with Bobby, the discussion DISC3 with Yvan and the discussion DISC4 with Yvan, but this time initiated by Yvan.

This display could have been obtained by using the different parameters of the indicators of the SMSs that have been stored with, possibly, the "direction" parameter to distinguish the SMSs whose indicators would have the same parameters TID, TO and SID.

This display on the screen ECRL of Laurent's apparatus is an ordered display, notably because the discussions are well differentiated on the display screen and this display is, in the event, also chronological at the level of the SMSs of each discussion. That said, this display may not be chronological taken overall. In practice, a discussion may very well be displayed first on the screen even if it has taken place timewise after a discussion displayed second. Thus, the user can decide the order of display of the different discussions on his screen.

When a user, for example Laurent, accesses his list of SMSs, he can decide to select an SMS for which a reply has already been sent to the party during a preceding discussion, and decide to send a new reply.

Then, in case of transmission of a new short message representing a new reply to a received short message to which a reply has already previously been sent during a discussion, this new short message is considered as a new short message initiating an auxiliary discussion, and the content of the indicator assigned to this new initiating short message is initialized with an initial content including an auxiliary identification of this auxiliary discussion.

In practice, the auxiliary discussion that will begin with this new reply then has to be distinguished from the parent discussion.

Figure 9:
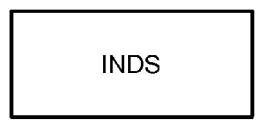

In order to determine whether a response has already been made to an SMS, each SMS, is, for example, assigned a supplementary indicator INDS (FIG. 9). This supplementary indicator INDS is not transmitted with the SMS but remains stored in the memory of the apparatus, for example in the SIM card.

Also, this supplementary indicator will be assigned a first indicative value, for example the logic value "TRUE", in case of a reply to an SMS, whereas a second indicative value will be assigned, for example the logic value "FALSE", otherwise. In practice, as will now be seen, this indicator is initialized with the value "FALSE".

Figure 10:
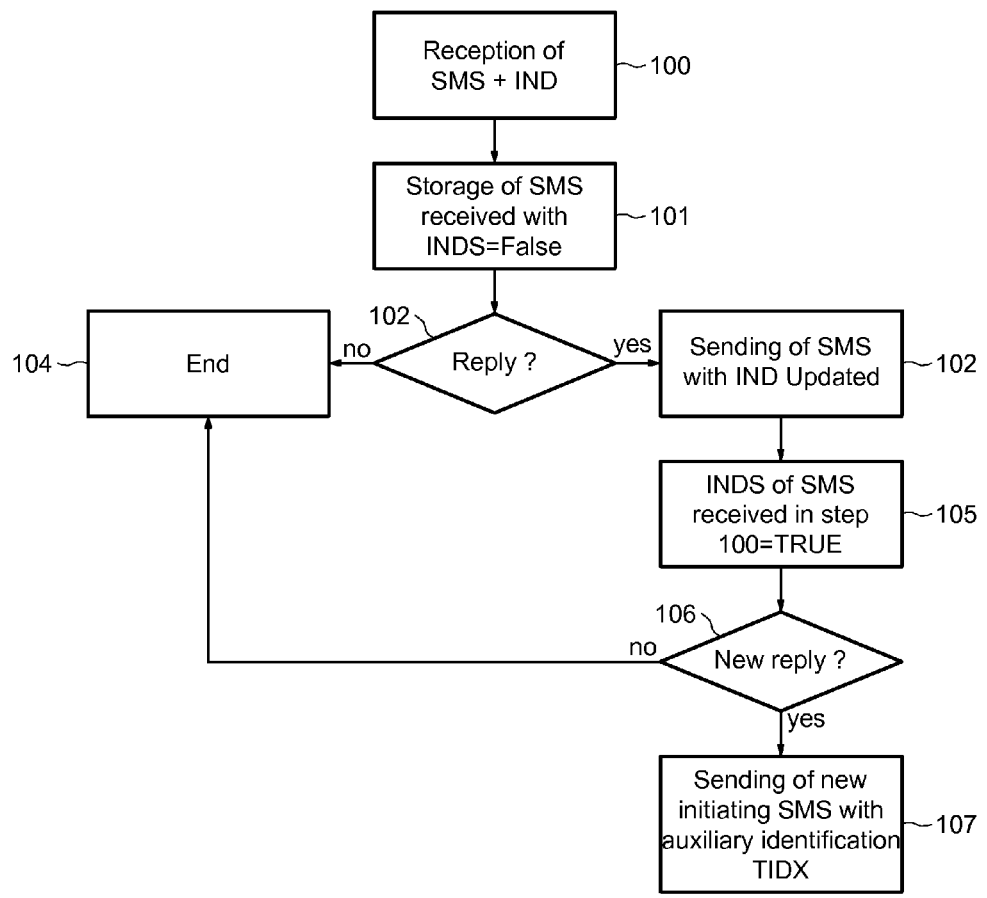
Figure 13:
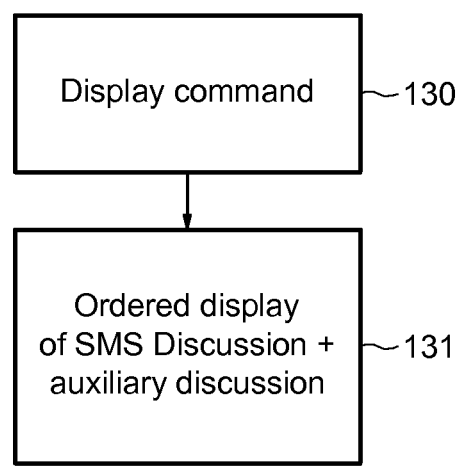

More specifically, and as illustrated in FIG. 10, in case of reception of an SMS and its indicator IND (Step 100), this SMS will be stored in the memory of the apparatus, for example in the SIM card, and this stored SMS will have its indicator INDS, initialized by default with the value "FALSE" added to it (Step 101). If there is no reply to this SMS (Steps 102 and 104), the process is terminated and the indicator INDS remains with the value "FALSE".

If an SMS is sent in reply, the indicator IND assigned to this SMS in reply is updated as explained hereinabove (Step 103), notably by not modifying the value of the parameter TID of the current discussion. Also, the indicator INDS associated with the stored SMS and that was received in the Step 100, is updated by assigning the logic value "TRUE" to this indicator INDS (Step 105).

If there is no new reply to the SMS received in the Step 100, the process is terminated and the indicator INDS remains with the value "TRUE" (Steps 106 and 104).

On the other hand, if there is a new reply to the SMS received in the Step 100 (Step 107), this new sent SMS will be considered as a new SMS initiating a new discussion, to which will be assigned the auxiliary identification TIDX in the first field of the indicator INDS.

An example of an auxiliary discussion initiated by Laurent will now be illustrated, some of its aspects being illustrated in particular in FIG. 11.

In this figure, the Steps 504 and 507 are identical to those of FIG. 5.

In the Step 514, Laurent decides to make another reply to the message no. 4 to which he has already replied. Because of this, the supplementary TIDX of the message no. 4 has the value "TRUE".

In these conditions, in the Step 514, the message no. 14, which constitutes a new reply to the message no. 4 ("reply" command in the telephone's command menu), also constitutes a new initiating short message assigned an indicator IND whose parameter TID is equal to "1", which corresponds to the value of the parameter TIDX. The parameter TO is equal to "1" and the parameter SID is initialized with the value "1".

Moreover, in order to be able to attach this auxiliary discussion that is beginning, to the parent discussion (TID=0), the parameters TID, TO and SID of the indicator IND of the message no. 4 are stored.

In the Steps 515, 516 and 517, the auxiliary discussion is continued with the incrementing of the parameter SID. Moreover, since a reply is made to the message no. 15, the supplementary indicator INDS of this message has the value "TRUE".

However, since the message no. 17 constitutes the end of the auxiliary discussion, that is to say, there is no reply to it, the indicator INDS of the message no. 17 has the logic value "FALSE".

Seen from the side of Yvan's apparatus, the auxiliary discussion is illustrated in FIG. 12. In this figure, the steps 609 to 612 are similar to the corresponding steps 514 to 517.

In response to a display command 130 (FIG. 13), it is then possible to have an ordered display of the SMSs relating to the discussion and to the auxiliary discussion (Step 131).

Figure 14:
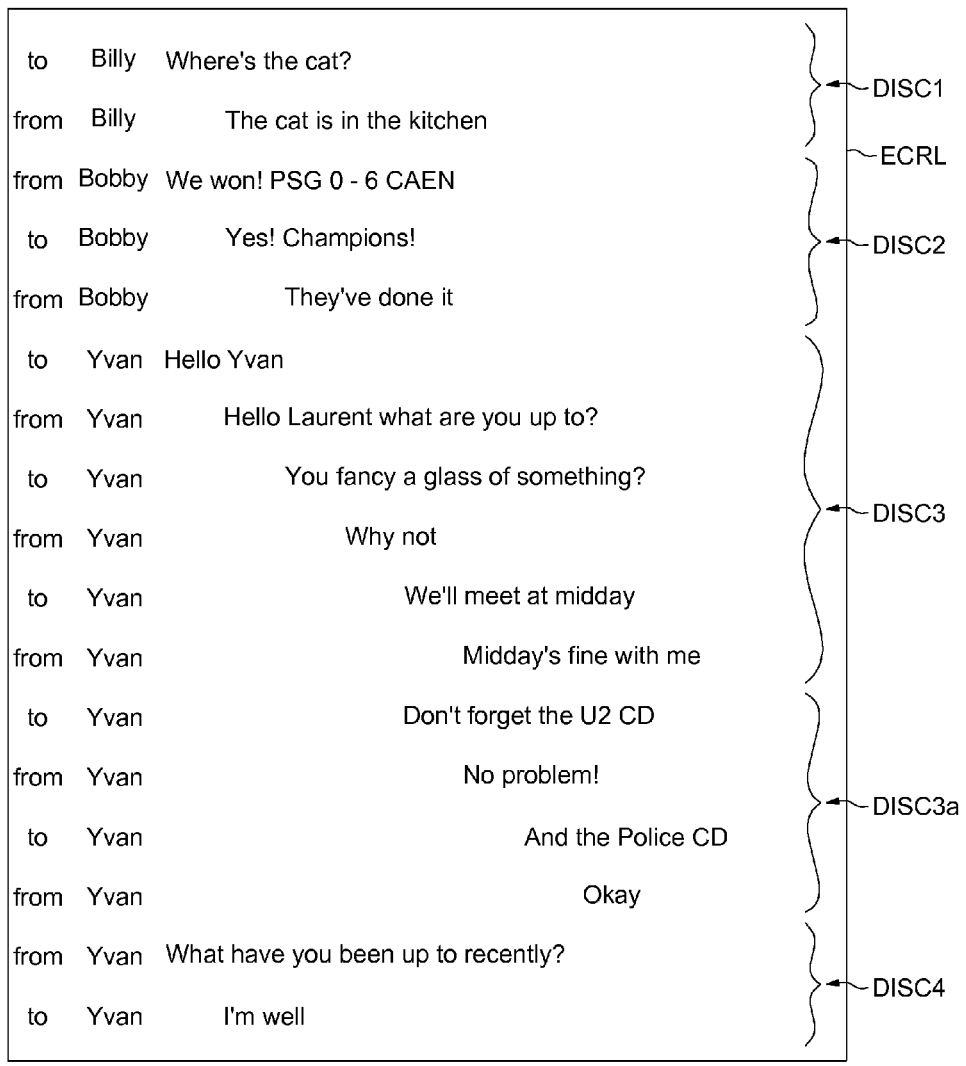

An example thereof is illustrated in FIG. 14. Thus, on the screen ECRL of Laurent's apparatus, there then appear the SMSs of the discussion DISC1, those of the discussion DISC2, those of the discussion DISC3, those of the auxiliary discussion DISC3a and those of the discussion DISC4.

It will be noted here that, because of the ordered display of the SMSs, those relating to the auxiliary discussion DISC3a are "attached" to the discussion DISC3 and, more particularly, the message "Don't forget the U2 CD", that constitutes a new reply to the message "Why not", is graphically at the same indent level as the message "We'll meet at midday", which was the first reply to the message "Why not".

Moreover, while the display of the SMSs within each discussion or auxiliary discussion is chronological, the overall display of the SMSs of a discussion and of an auxiliary discussion may not be chronological. Such is the case, for example, in which Yvan's reply "Midday is fine with me" was received at 11h50 whereas the message "Don't forget the U2 CD" was sent at 11h20.

FIG. 15 illustrates a wireless communication apparatus UE comprising means making it possible notably to implement the method of processing SMSs that has just been described.

This apparatus UE comprises an interface INT connected to an antenna ANT configured to send and receive short messages assigned indicators transmitted with said short messages. This interface INT notably comprises the analogue part of the transmission and reception subsystems.

Processing means MT including the initialization means MINT able to initialize the content of the indicators IND are connected to this interface.

The processing means also include updating means MMAJ configured to update the contents of the indicators IND during the discussion and, where appropriate, a supplementary block BLS configured to assign the logic values "TRUE" or "FALSE" to a supplementary indicator INDS.

In addition to these means, the apparatus also comprises a user interface CL, for example a keyboard, making it possible notably for the user to control the sending of SMSs, and to control the display on the screen ECRL of the lists of SMSs relating to said discussions.

In this respect, in response to this display command, generation means MELB will search in memory for the stored SMSs to sort them according to the content of the indicators and supplementary indicators so as to deliver to the screen a signal containing the information allowing for an ordered display of the SMSs of said discussions.

These various means MINT, MMAJ, BLS, MELB are, for example, produced as software within the baseband processor of the telephone UE, from functionalities of these means.

The apparatus UE also comprises a SIM card incorporating memory means MM for storing the SMSs and their associated indicators IND and INDS.

So as to ensure interoperability with apparatus UE that process the SMSs according to the 3GPP Standard TS23.040 but that do not incorporate the means according to the invention as just described, for the ordered display of SMSs, provision is advantageously made to place the indicators IND in the user data headers of the SMS within the ranges of values specified by the standard as being reserved for future use. These are, for example, the ranges A0-BF, or even the ranges E0-FF. In practice, according to the specifications of this standard, an apparatus that does not incorporate the means according to the invention will purely and simply not recognize the indicators IND.

Similarly, the indicator INDX can consist of bit b4 of the entry in the file EF_SMS defined in the 3GPP Standard TS31.102 notably relating to the SIM card. Here again, an apparatus that does not incorporate the means of the invention while being compatible with the Standard TS 31.102 will not recognize this bit b4.

The invention claimed is:

1. A method of processing short messages in a wireless communication system, comprising:
   assigning to short messages, by a wireless communication apparatus, indicators transmitted with the short messages;
   initializing, upon transmission of a short message initiating a discussion, a content of an indicator assigned to the short message initiating the discussion with an initial content including an identification of the discussion; and
   updating the content of the indicator of each short non-error message sent in response to a received short message and relating to the discussion based on the content of the indicator of the received short message.

2. The method of claim 1, further comprising storing, in each wireless communication apparatus involved in the discussion, short messages relating to the discussion and corresponding indicators, and in response to a display command on one of the wireless communication apparatus, providing an ordered display of short messages sent and received by the one of the wireless communication apparatus during the discussion.

3. The method of claim 2, wherein each wireless communication apparatus includes a subscriber identification module (SIM), and all short messages relating to the discussion and their assigned indicators are stored in the SIM.

4. The method of claim 1, wherein an indicator comprises a first field, a second field, and a third field (SID); initializing the content of the indicator assigned to the short message initiating the discussion comprises:
   assigning to the first field an identification value representative of the identification of the discussion;
   assigning a first informative value to the second field; and
   assigning an initial value to the third field; and
   updating the content of the indicator of a short non-error message sent in reply to the received short message comprises:
   assigning to the first field the identification value;
   assigning to the second field the first informative value if the short message is sent by the wireless communication apparatus initiating the discussion and otherwise a second informative value different from the first informative value; and
   incrementing the value of the third field of the received short message so as to obtain the value of the third field of the short message sent in response to the received short message.

5. The method of claim 1, wherein the indicators are inserted into headers of the short messages in available positions.

6. The method of claim 1, wherein in the event of transmission of a new short message representing a new reply to the received short message to which a reply has already been given previously during the discussion, considering the new short message as a new short message initiating an auxiliary discussion; and initializing a content of the indicator assigned to the new short message with an initial content including an auxiliary identification of the auxiliary discussion.

7. The method of claim 6, further comprising storing all short messages relating to the auxiliary discussion and corresponding indicators in each wireless communication apparatus involved in the auxiliary discussion; and in response to a display command on an involved wireless communication apparatus, presenting an ordered display of the short messages sent and received by the involved wireless communication apparatus during the discussion and the auxiliary discussion.

8. The method of claim 6, wherein each short message is also assigned a supplementary indicator; each time a reply is sent to the received short message that relates to the discussion, a first indicative value is assigned to the supplementary indicator assigned to the received short message; a second indicative value is assigned to the supplementary indicator if there is no reply to the received short message; and if the new short message representing a new reply to the received short message assigned a supplementary indicator having the first indicative value is sent, the new short message is considered to be the new short message initiating the auxiliary discussion.

9. The method of claim 8, wherein all short messages of the auxiliary discussion and assigned supplementary indicators are stored in a subscriber identification module.

10. The method of claim 9, wherein a supplementary indicator of a short message is represented by a predetermined bit of an entry in an EF_SMS file.

11. A wireless communication apparatus, comprising:
an interface configured to send and receive short messages having assigned indicators transmitted with the short messages, and
a processor, including an initializer configured to initialize a content of the indicator associated with a short message initiating a discussion with an initial content including an identification of the discussion, and an updater configured to update the content of the indicator of each short non-error message to be sent in reply to a received short message relating to the discussion based on the content of the indicator of the received short message.

12. The apparatus of claim 11, further comprising a memory configured to store short messages relating to the discussion and corresponding indicators, a display, and a user interface, wherein the processor further includes a generator coupled to the memory and configured, in response to a command on the user interface, to deliver to the display an ordered display of short messages sent and received by the apparatus during the discussion.

13. The apparatus of claim 12, further comprising a subscriber identification module (SIM) that includes the memory.

14. The apparatus of claim 11, wherein the indicator includes a first field, a second field, and a third field, and the initial content of the indicator assigned to the short message initiating the discussion comprises:
in the first field, an identification value representative of the identification of the discussion;
in the second field, a first informative value;
in the third field, an initial value; and
the updater is configured to:
assign the identification value to the first field,
assign the first informative value to the second field if the apparatus is the apparatus initiating the discussion and a second informative value different from the first informative value otherwise, and
increment the value of the third field of the received short message so as to obtain the value of the third field of the short non-error message to be sent in reply to the respective received short message.

15. The apparatus of claim 11, wherein the indicators are inserted into headers of the short messages in available positions.

16. The apparatus of claim 12, wherein the initializer is configured to, in the case of a new short message to be sent and representing a new reply to the received short message having already been the subject of a reply during the discussion, initialize the content of the indicator assigned to the new short message with an initial content so as to consider the new short message as a new short message initiating an auxiliary discussion, the initial content of the new initiating message including an auxiliary identification of the auxiliary discussion.

17. The apparatus of claim 16, wherein the memory is configured to store short messages relating to the auxiliary discussion and corresponding indicators, and the generator is configured to, in reply to the command on the user interface, deliver to the display short messages sent and received by the apparatus during the auxiliary discussion so as to obtain an ordered display of the short messages of the discussion and of the auxiliary discussion.

18. The apparatus of claim 16, wherein each short message is also assigned a supplementary indicator, and the processor includes a supplementary block configured to assign a first indicative value to the supplementary indicator assigned to the received short message relating to the discussion and intended to give rise to a reply, and assign a second indicative value to the supplementary indicator if there is no reply to the received short message, and if a new short message representing a new reply to the received short message assigned a supplementary indicator having the first indicative value is sent, the new short message is considered to be the new short message initiating the auxiliary discussion.

19. The apparatus of claim 18, wherein all short messages of the auxiliary discussion and assigned supplementary indicators are stored in a subscriber identification module (SIM).

20. The apparatus of claim 19, wherein a supplementary indicator of a short message is represented by a predetermined bit of an entry in an EF_SMS file.

* * * * *